United States Patent Office 3,502,698
Patented Mar. 24, 1970

3,502,698
NOVEL 13α-LOWER ALKYLGONA-1,3,5(10)-TRIENES
Reinhardt P. Stein, Conshohocken, and Herchel Smith, Wayne, Pa., assignors to American Home Products Corporation, New York, N.Y., a corporation of Delaware
No Drawing. Filed Apr. 16, 1968, Ser. No. 721,592
Int. Cl. C07c *169/08, 169/10;* A61k *17/06*
U.S. Cl. 260—397.4                           3 Claims

ABSTRACT OF THE DISCLOSURE

The disclosure involves the production of novel 13α-lower alkylgona-1,3,5(10)-triene-17-ones by irradiation technique producing compounds that are pharmacologically active.

BACKGROUND OF THE INVENTION

In the text of Fieser and Fieser, "Organic Chemistry," third ed., Reinhold (1956), irradiation of the steroidal compound ergosterol is described involving a series of steps which eventually result in the active vitamin $D_2$, an opened B ring structure. The text describes the results of stepwise irradiation yielding intermediate compounds devoid of antirachitic activity, identifying these as lumisterol and tachysterol.

In their later text on "Steroids," Reinhold (1959), Fieser and Fieser elaborate on the effects of irradiation and mention inter alia, the irradiation of estrone, forming lumiestrone, which is indicated as physiologically inactive as is also lumiandrosterone, the $C_{13}$-epimer of androsterone, produced by irradiation.

It would appear, therefore, that irradiation of a steroid could change a β- to an α-configuration but in doing so, the α-compound would be expected to be physiologically inactive. Applicants' discovery is that their method of irradiation of selected steroids does not make the compounds physiologically inactive but, on the contrary, results in hormonally active compounds.

The present invention relates to the preparation of novel 13α-lower alkylgona-1,3,5(10)-trienes possessing estrogenic activity.

The compounds of the invention are optically active d-forms of the estratrienes illustrated by the general formula:

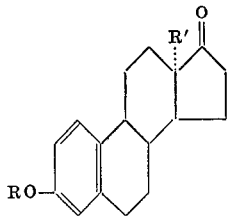

in which RO represents hydroxy or lower alkoxy, preferably of 1 to 2 carbons atoms, and R' is a lower alkyl, preferably of 1 to 4 carbon atoms.

To prepare the compounds indicated above, one starts with 3-hydroxy or alkoxy-13β-lower alkylgona-1,3,5(10)-triene-17-ones, which are known compounds, described in Smith et al., J. Med. Chem. 10, 199 (1967), in Smith et al., J. Chem. Soc., 4472 (1964) and elsewhere.

The starting substances are put into solution, using an inert solvent, for example, benzene, tetrahydrofuran, diethyl ether, dioxane, or other non-protonic solvents in a container with dry nitrogen and substantially free of oxygen. Irradiation is carried out using a light source rich in the ultraviolet band at a wave-length from 200 to 400 millimicrons (mμ). Irradiation is maintained for 2 to 20 hours.

The following examples are illustrative of the procedure for changing a 13β- to a 13α- configuration.

EXAMPLE 1 d(+)13α-ethyl-3-hydroxygona-1,3,5(10)-triene-17-one

A solution of d-13β-ethyl-3-hydroxygona - 1,3,5(10)-trien-17-one (4.00 g., $[\alpha]_D^{24}=+110.3°$) in spectrograde dioxane (200 ml.) was placed in a quart flask under dry nitrogen and irradiated at ca. 25 cm. from a Hanovia No. 7420 325-watt quartz lamp for 20 hours. The solution was cooled to room temperature and the solvent removed in vacuo to give a semi-solid. The material was triturated with methanol and filtered. The solid was washed with methanol and dried to give 1.35 g. of crude product, M.P. 230–235° C., $[\alpha]_D^{25}=+25°$ (1% dioxane). The solid was purified further by dissolving in boiling tetrahydrofurane, treating with activated charcoal (Nuchar) and filtering through diatomaceous earth (Super Cel). The filtrate was boiled to low volume and allowed to crystallize to give 0.490 g. of the desired product as colorless prisms, M.P. 233–235° C.; $[\alpha]_D^{25}=+9.2°$;

$\lambda_{max}^{KB}$. 3.07, 5.87μ

*Analysis.*—Calcd. for $C_{19}H_{24}O_2$ (percent): C, 80.24; H, 8.51. Found (percent): C, 79.97; H, 8.25.

EXAMPLE 2

1(+)-13α-estrone-3-methyl ether

A solution of 1-estrone-3-methyl ether (3.00 g.) in spectrograde dioxane (75 ml.) under an atmosphere of dry oxygen-free nitrogen (quart flask) was irradiated for 17 hours at a distance of ca. 25 cm. from a Hanovia No. 7420 325-watt quartz lamp. The cooled solution was stripped in vacuo to a yellow oil. Methanol (50 ml.), Girard's "T" reagent (3.0 g.) and glacial acetic acid (3 ml.) were added and the solution was refluxed for 1 hour. The solution was cooled to room temperature and poured into 200 ml. of water containing 6 g. of potassium carbonate. The mixture was extracted well with ether. The ether extract was washed well with saturated sodium chloride solution then dried over anhydrous sodium sulfate. The solution was filtered, and the filtrate stripped in vacuo to crystalline solid (crude weight 1.7 g.). The solid was treated with charcoal in methylene chloride solution, filtered through Super Cel and the filtrate boiled to low volume on the steam bath. Ethanol was added and boiled to remove the methylene chloride. The solution was allowed to stand to give 0.94 g. of title product; M.P. 126–128° C. Second crops were collected, dissolved in benzene and passed through a neutral alumina column (grade II). The benzene eluants were stripped in vacuo to give a colorless oil. The oil was triturated with methanol to give 0.260 g. of the title product. A sample was recrystallized from acetone-hexane to give colorless prisms; M.P. 129–130.5° C.;

$\lambda_{max}^{KBr}$. 5.81μ

$[\alpha]_D^{21.5}=+27.8°$; (C=1, CHCl$_3$);

*Analysis.*—Calcd. for $C_{19}H_{24}O_2$ (percent): C, 80.24; H, 8.51. Found (percent): C, 80.14; H, 8.34.

In addition to their pharmacological utility, the products can be used as intermediates in the preparation of other useful hormonal steroids by known procedures. Thus, by the use of an appropriate organometallic reagent, for example, an organomagnesium halide, or lithium acetylide or lithium ethyl, one may convert a 3-methoxy-13αgona-1,3,5(10) - triene-17-one to a 17-hydroxy-17-alkyl, alkenyl or alkynyl-13α-alkyl-3-methoxygona - 1,3,5(10)triene. For procedures describing reactions of this type, see, for example, British Patent No. 1,041,279, published Sept. 1, 1966.

In testing the compounds of the invention for possible pharmacological activity and use in experimental pharmacology, a pharmacologist would use the compounds in known manner first in a screening procedure and then, if desired, in comparison with other compounds of the same type. Standard screening procedures have been extensively published and are known to the man skilled in the art. One procedure for estrogenic activity is as follows:

Test compounds are administered to groups of mice on the mornings of two successive days and vaginal smears are taken on the afternoon of the third day. Animals that do not respond on day three are smeared a second time on the morning of day four. Proportion of mice responding with cornified vaginal smears is increased by active compounds (Edgren and Calhoun, Amer. J. Physio., 189:355–357, 1959).

Estrogenic activity and use in this area was found at 1,000 gamma total dose administered at a daily dosage of 250 gamma/day.

Other tests for biological activity are described in "Recent Progress in Hormone Research," Academic Press—vol. 22, pages 305–349 (1966).

For pharmacological purposes, the compounds are usually administered parenterally, e.g., subcutaneously, and the host animal is the mouse or rat. The active compound is administered with a liquid vehicle or carrier, oil generally being used when dealing with water-insoluble compounds.

The invention claimed is:

1. The optically active *d* form of steroids having the structural formula:

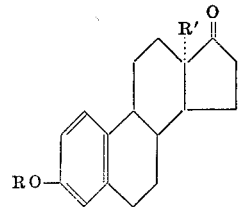

in which R is hydrogen or a lower alkyl of 1 to 2 carbon atoms and R' is a lower alkyl of 2 to 4 carbon atoms, the dotted line representing α-configuration.

2. A compound of claim 1; in which R is hydrogen and R' is a polycarbonalkyl of 2 to 4 carbon atoms.

3. As a compound of claim 1; *d*-13α-ethyl-3-hydroxy-gona-1,3,5(10)-triene-17-one.

References Cited

Djerassi et al., Journ. Amer. Chem. Soc., vol. 84, December 1962, pp. 4544–4552, page 4545 pertinent.

Bots, Recueil Trav. Chim. Pays-Bas, vol. 77, 1958, pp. 1010–1016.

ELBERT L. ROBERTS, Primary Examiner

E. G. LOVE, Assistant Examiner

U.S. Cl. X.R.

204—158; 424—243